Sept. 12, 1950  T. T. SCOTT  2,521,999
HAY CRUSHING MACHINE
Filed July 3, 1947  3 Sheets-Sheet 2

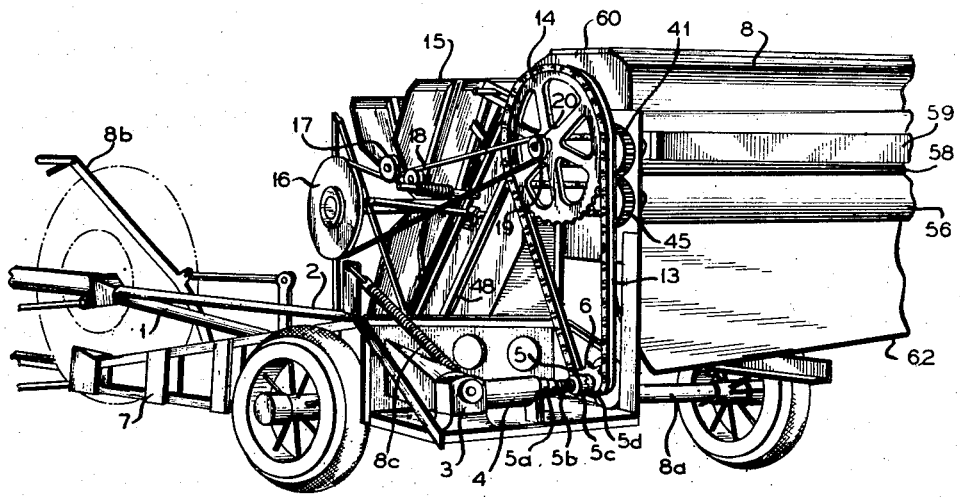

INVENTOR.
T. T. SCOTT
BY
A. Yates Dowell
ATTORNEY

Sept. 12, 1950     T. T. SCOTT     2,521,999
HAY CRUSHING MACHINE

Filed July 3, 1947     3 Sheets-Sheet 3

INVENTOR.
T. T. SCOTT
BY
*A. Yates Dowell*
ATTORNEY

Patented Sept. 12, 1950

2,521,999

UNITED STATES PATENT OFFICE 2,521,999

HAY CRUSHING MACHINE

Thurman T. Scott, Thomasville, Ga.

Application July 3, 1947, Serial No. 758,785

3 Claims. (Cl. 56—1)

The object of my invention is to provide a novel hay crushing machine which will cut hay and deliver it by an endless conveyor to rollers which crush the hay, in a single, continuous operation, and thus hasten its drying or curing so that the hay or other harvest may be more quickly handled and the hay will not have to remain in the sun so long that it becomes "baked out" with the resultant loss of much food value, minerals, vitamins, etc. Additional advantages in such quick-curing of hay are these: First, because the hay is stored sooner, it is less likely to get rained on and thus damaged; second, the hay does not have to be stacked; it can be air-cured quickly on the ground, then windrowed and baled or gathered from the windrow, thus saving considerable labor and making for an easier as well as a faster operation; third, the stems of some hay crops, such as cow-pea, soybean, kudzu and others, tend to become tough and woody during the usual curing operation, thus making them extremely unpalatable to livestock. When crushed and quickly cured, as with this machine, the stems remain tender and are palatable to livestock.

It is a particular object of my invention to provide a machine that will operate efficiently on cow-pea, soybean, clover, kudzu and other "tough" hay as well as alfalfa and grass hay and handle all more quickly and more economically than has been possible by prior methods. Because of a novel arrangement on this machine, it is possible to cut and crush effectively either fine or heavy-stemmed hay without squeezing valuable food-bearing juices from the hay.

I attain these and other objects of my invention by the mechanism illustrated in the accompanying drawings in which:

Figure 1 is a perspective view of the machine as seen from the left hand side and rear end;

Fig. 2 is a perspective view of the machine as seen from the right hand side in front of the cutter bars and revolving paddles;

Figure 4:
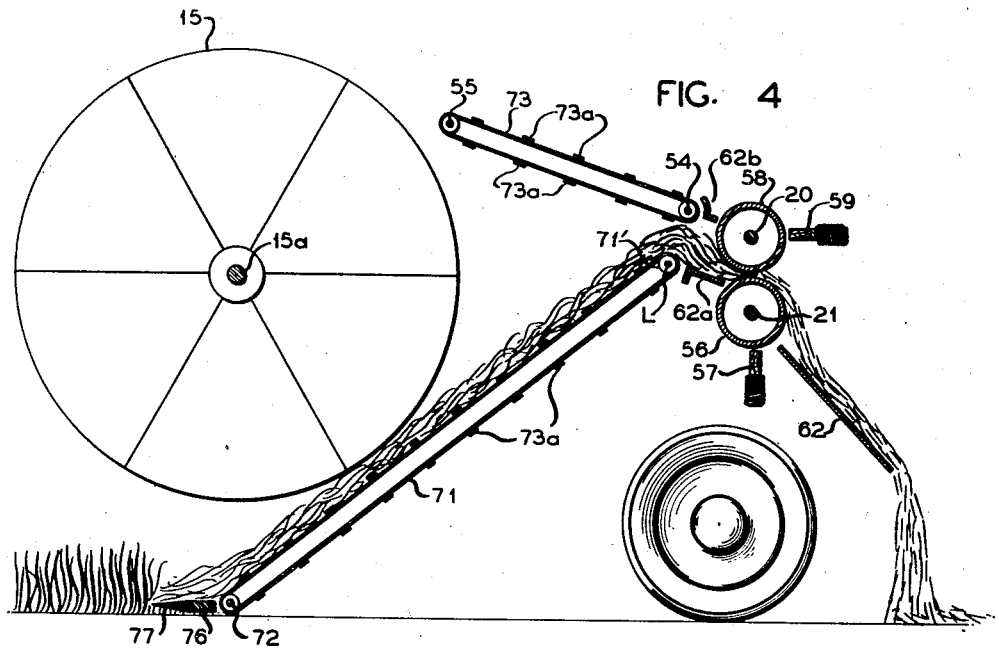
Fig. 4 is a diagrammatic view of the hay crusher viewed from the left hand side showing the relation of the bottom and top conveyor belts, shelf and crushing rollers.

Referring to the accompanying drawings, I provide a power drive shaft 1 (Fig. 1), covered by a shield 2. Power drive shaft 1 is operatively connected by a gear reduction assembly 3 to the drive shaft 4, and extends all the way through slip or jump-type clutch 5. Drive shaft 4 actuates the drive shaft sprocket 6, as shown in Fig. 1. Sprocket 6 drives the sprocket chain 13, which drives the large sprocket 14. Sprocket 14 is mounted on the top crusher roller shaft 20.

Mounted and keyed on to shaft 20 are the following parts, beginning at the left end of shaft 20 and continuing on to the other or right end: drive pulley 19, sprocket 14, drive sprocket 38, crusher roller 58, and drive sprocket 24, the shaft being mounted adjacent its ends on bearings 22.

Drive sprocket 38 through sprocket chain 39 drives sprocket 40 which is mounted on and keyed to the same shaft with upper gear 41. Gear 41 drives lower gear 45. Mounted and keyed on the same shaft as gear 45 is sprocket 44 which, through sprocket chain 43, drives sprocket 42 which is mounted on bottom crusher roller shaft 21.

Mounted on and keyed to shaft 21 are the following parts, starting from the left end and continuing to the right end of the shaft: sprocket 42, bottom crusher roller 58 the shaft 21 being mounted adjacent its ends on bearings 36.

As shown in Figure 1: reel-drive pulley 19, through belt 18, drives reel pulley 16. Pulley 16 is mounted on shaft 15A which carries a reel or revolving paddles 15 (see Fig. 2). Belt 18 is engaged by idlers 17 which maintain tension on the belt.

Figure 3:
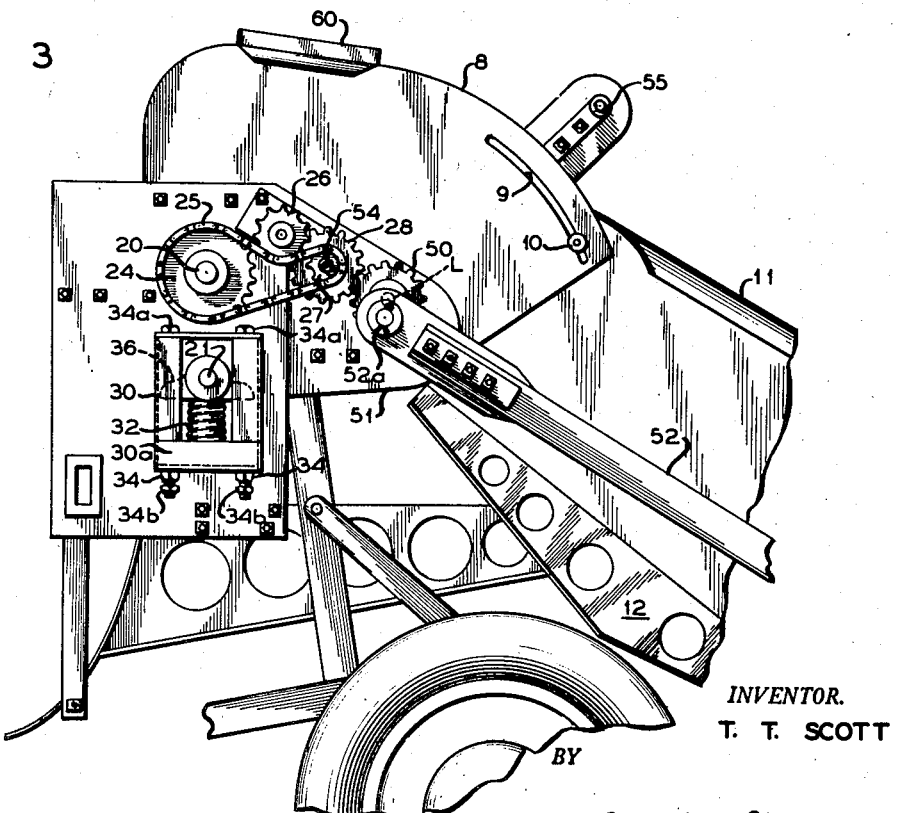
Fig. 3 is an enlarged side elevation of a portion of the right hand side of the machine.

Referring to Figure 3 drive sprocket 24, which is mounted on and keyed to the right hand end of upper crusher roller shaft 20, through drive chain 25 which passes under idler 26 drives sprocket 27. Sprocket 27 is mounted on shaft 54. Shaft 54 extends completely through to the other side of housing 8 and carries, between the two sides of frame or housing 8, the drive roller on which upper conveyor canvas belt 73 (Fig. 2) is mounted. Also mounted on and keyed to shaft 54, next to sprocket 27, is drive gear 28.

Drive gear 28 engages gear 50 which is mounted on shaft L. Shaft L extends completely through to the other side of housing 8 and carries the drive roller 71' on which the lower or main conveyor canvas belt 71 (Fig. 4) is mounted. Gear 50 is also the eccentric drive or crank for pitman arm 52 as it contains shaft 52A on which bearing of pitman shaft 52 is mounted. Shaft 52A is mounted on gear 50 about half way between the toothed edge and the center of the gear and the opposite side of the gear is weighted to counterbalance the movement and march of pitman arm 52. Essentially the drive is the same for pitman arm 46 on the opposite or left side of the machine and on the other end of shaft L.

Ball-and-socket bearing 53 connects pitman arm 52 with rocker arm 64. Rocker arm 64 is mounted on shaft or pin 65 and actuates a second pitman arm 66 through ball-and-socket bearing 69. Pitman arm 66 is attached to vertical mower or cutter bar 79 through bearing 70. A shield 67 is provided to protect rocker arm 64.

On the opposite or left side of the machine, shield 68 (Fig. 2) is provided to protect a similar rocker arm drive for horizontal mower or cutter bar 77 (Fig. 2), driven by pitman arm 46.

The lower conveyor belt 71 is driven by shaft L and the opposite end is carried by a shaft 72. Upper conveyor belt 73 is driven by shaft 54 and the opposite end is carried by shaft 55. Both the lower and the upper conveyor belts are endless, made of canvas and with small wooden strips or slats 73a (see Fig. 4) tacked to the canvas to reduce slippage of the matter carried.

Both of the crushing rollers (58 and 56) are provided with scrapers or cleaners. The scraper for crushing rollers 58 is shown at 59 and the scraper for roll 56 at 57. These scrapers are burlap-wrapped 2 x 6 boards. Contact against the crushing rollers is maintained by a spring, not shown, at each end of the scrapers.

Bearings 22 for upper crusher roller 58, which is carried on shaft 20, are rigidly mounted on and bolted to the crusher roller housing or frame. Thus upper crusher roller 58 turns or revolves only: it is not movable up and down, or laterally.

Figure 7:
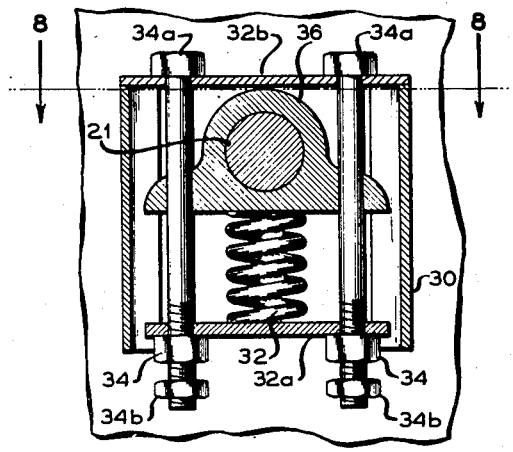
Fig. 7 is a vertical sectional view of the bearing for the bottom roller shaft.
Figure 6:
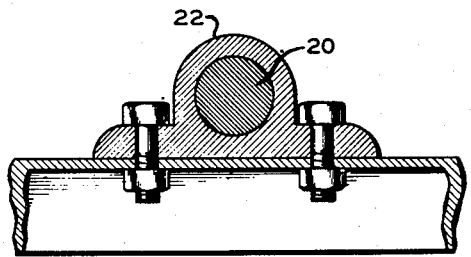
Fig. 6 is a vertical sectional view of the bearing for top roller shaft 20.
Figure 8:
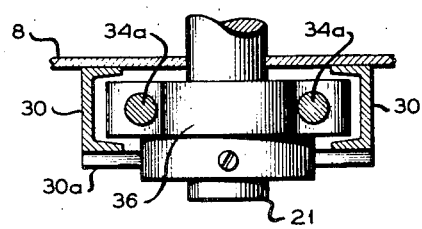
Fig. 8 is a section on line 8—8 of Fig. 7.

Bottom crusher roller 56, carried on shaft 21, also turns or revolves and further is movable down and up to allow thick masses of hay material or sticks and foreign matter to pass between the crusher rollers. The movability is accomplished by having channel housings for bearings 36 of shaft 21. Fig. 7 illustrates channel housing 30 for bearing 36 on the right side of the machine; a similar channel housing is located on the other or left end of the machine and its contents are precisely the same. The channel housing 30 is rigidly mounted on crusher roller frame or housing 8. Housing 30 contains box bearing 36 which is mounted on shaft 21, compression spring 32, bottom plate 32a and bolts 34a. 32b is the top of housing 30. 34 are the adjusting nuts on bolts 34a, and 34b are the lock nuts. Housing 30 is slightly wider and deeper than bearing 36 and plate 32a so that both can freely move up and down in the housing. Bolts 34a go through bearing 36 to keep it from wobbling and, along with compression spring 32, to prevent it from turning or revolving with shaft 21. Pressure of bottom crusher roller 56 against top crusher roller 58 is regulated by adjusting nuts 34 and of course by the corresponding adjusting nuts under the channel housing located on the opposite or left side of the machine.

Thus, bottom crusher roller 56 can move down and up evenly at both ends, or either end can move down and up independently of the other end. If thick masses of hay material come into the crushing rollers evenly along the length of the rollers or else just at either end of the rollers, they separate accordingly to accommodate the mass. As soon as the thick masses have passed through, the crusher roller 56 moves back to its original elevated position because of the compression springs 31 and 32.

Side frames 11 served to support lower conveyor belt 71, horizontal mower or cutter bar 77, vertical mower or cutter bar 79, revolving reel or paddles 15, and the parts associated therewith. Frames 11 can be raised or lowered, according to the cutting height desired, by lever 8b (see Fig. 1). Heavy spring 8c counteracts a portion of the weight of frames 11. Frames 11 raise or lower independently of the rest of the machine; shaft L is its fulcrum (see Fig. 3). Crusher roller housing 8 (Fig. 3) contains slot 9 in which bolt 10 moves back and forth as frames 11 are raised and lowered. As illustrated in Fig. 3, frames 11 are in the down or low-cutting position. 12 is a cross-brace support under frames 11.

Refer to Fig. 1: 7 is the frame or platform of this machine and it can be attached to the drawbar of a tractor. A lid 60 on the top of the machine permits the cleaning out of the front side of rollers 58 and 56. 8 is the housing or framework of the machine, mounted on and supported by the main axle 8a, also it is secured to frame 7 which is also mounted on axle 8a. Frame 8 contains crushing rollers 58 and 56, bearings, shafts, sprockets and gears for the same; scrapers 59 and 57 (in Figure 1, scraper 57 is not seen as it is located behind shield 62 and directly under bottom crusher roller 56); shield 62; shelves 62a and 62b, Figure 4; upper conveyor belt 73, its rollers and component parts; and shaft L, which is the fulcrum for frames 11, and component parts.

Figure 5:
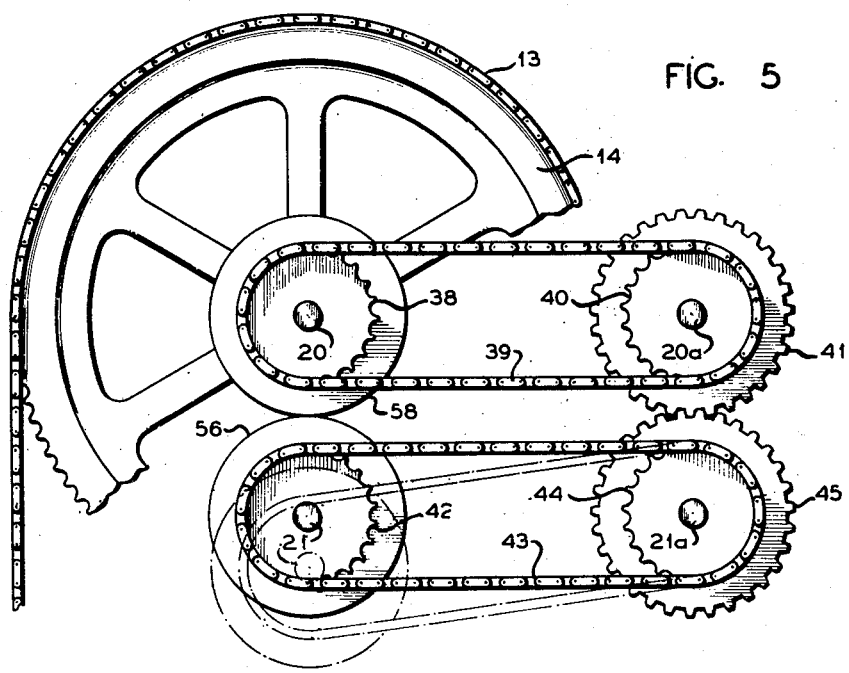
Fig. 5 is a detail side elevational view illustrating the drive assembly for the rollers, the dotted lines indicating the lowered position of the movable bottom roller.

This machine is towed by a tractor and operated or powered by the tractor. Drive shaft 1 (Fig. 1) is connected to the power take-off shaft of the tractor by two universal joints, which allow for bending of the shaft. Shaft 1 drives shaft 4 and its sprocket 6 which drives large spocket 14. Sprocket 14, through shaft 20 drives pulley 19 and revolving reel or paddles 15 and also drives both crusher rollers (top roller 58 is driven direct, bottom roller 56 is driven through gears 41 and 45 as shown in Fig. 5) and also drives sprocket 24, Figure 3. Sprocket 24 drives shaft 54 which carries gear 28 and upper conveyor canvas belt 73. Gear 28 drives gear 30 and thus shaft L which contains the drive roller for lower conveyor canvas belt 71, also contains the cranks or eccentric drives for the mower or cutter bars, the crank for the vertical cutter bar 79 being on its right end and the crank for the horizontal cutter bar 77 being on its left end.

The timing of the essential moving parts of this machine is arranged so that the cutter bars move considerably faster than the conveyor belts, the conveyor belts move slightly faster than the forward motion of the machine and the crushing rollers move slightly faster than the conveyor belts.

Fig. 4 is a diagrammatic view, illustrating the operation of the machine in practice. As mower bar 77 cuts the hay material it passes over the bar and onto lower conveyor belt 71, or more strictly speaking the mower bar moves under the material so that it falls over on the conveyor belt. The conveyor belt then takes the cut hay material up (revolving reel or paddles 15 assist in moving, especially starting, the material up the belt) and into crusher rollers 58 and 56, where it is crushed and the stems cracked, and then spilled out over shield 62 to the ground.

Continuing with Fig. 4, the top conveyor belt will tend to direct hay material onto the shelf and into the "jaws" of crushing rollers as well as having a flattening-down effect on the material. This is important as material travels up the belt rapidly and is frequently deposited on the lower belt in thick and heavy bunches, often uneven laterally. It must feed or travel smoothly into the crushing rollers.

The direction of movement of the front surface of the upper belt is directly opposite to the top surface of the lower belt. The relation of the upper and lower belts as shown in Fig. 4 is important. The lower conveyor belt moves the hay material up against the upper conveyor belt. The upper conveyor belt then tends to compress it slightly and thus shaped and directed, as well as "held" between the upper conveyor belt and the lower conveyor belt, the hay is moved easily between shelves 62a and 62b into the jaws of the crushing rollers 56 and 58. This is the reason why shaft 54 must be above and to the right of shaft L as shown in Fig. 4.

The position and pitch of shelf 62a is important as when the mass of hay material is so thin, short, scattered or in small bits that it will not touch the upper conveyor belt and thus be thrust by the two conveyor belts into the rollers, it then falls from the lower conveyor belt onto shelf 62a and gravitates or slides down into the jaws of the crushing rollers.

Referring to Fig. 5, an important feature of this machine is the drive assembly for the two crusher rollers 58 and 56. The top roller 58 is stationary so far as vertical and lateral movement is concerned, but the bottom roller 56 must move up and down and thus allow for a thick bunch of vines or hay material to pass through. The drive assembly shown allows this motion in the bottom roller, but such motion does not interfere with the drive. There is no slip of chains or gears. It is a positive drive at all times, and there is no chance for the timing to slip as both rollers turn at the same speed at all times.

Because the bottom crusher roller is the movable roller, it is possible to get as little pressure or as much pressure as is desired between the two crushing rollers. This is important because it is never desirable to squeeze the essential juices out of the hay. If the top roller were the movable roller and all the pressure were removed from the springs, there would still be the weight of the roller (and that is considerable) against the bottom roller.

Another important feature is the vertical cutter blade 79. This permits the cutting of a clean swath and prevents entangled or entwined vines, weeds or grass from dragging against the hay material and interfering with its moving up the conveyor belt 71.

The draft for the hay crushing machine is set slightly off center so that even though the tractor moves in a straight line and directly parallel to the cutting edge of the hay material, the hay crushing machine itself moves slightly crabwise or sideways.

This is a very important feature as the crushed hay, after it spills over the shield 62, is deposited on the ground in a swath which is slightly to the left or tractor-side of the machine. Therefore, on the next round (and this machine like any combine or mower would nearly always be worked around and around the field in a generally circular direction towards the center of the field), there is a clean path of about one foot between the uncut vines or hay material and the crushed material that is on the ground. The tractor wheel can be kept in that path, and it is thus easy to guide; and the shield 68 will not become clogged or fouled with the cut and crushed material.

I claim:

1. A hay crushing machine comprising in combination means for cutting the hay, drive means for said cutting means, a shaft rotatably mounted on said machine and having paddles constructed and arranged to urge the cut hay into engagement with a conveyor belt, said conveyor belt being disposed in an inclined position to receive hay from said cutting means and convey the same upwardly to crushing rollers, said crushing rollers being mounted for rotation on said machine, one of said rollers being resiliently urged into engagement with the other of said rollers in order to yield and permit the passage of large bunches of hay or other obstructions, means for driving said crushing rollers and cleaning means associated with said rollers and comprising scraper blades having relatively soft yieldable surfaces engaging said rollers to remove foreign material therefrom.

2. A hay crushing machine as defined in claim 1 in which the conveyor belt is operated at a speed faster than the forward motion of the crushing machine.

3. A hay crushing machine as defined in claim 1 in which the surface speed of the crushing rollers is greater than the surface speed of the conveyor belt.

THURMAN T. SCOTT.

REFERENCES CITED

The following references are of record in the file of this patent:

UNITED STATES PATENTS

| Number | Name | Date |
|---|---|---|
| 646,862 | McCollum | Apr. 3, 1900 |
| 721,064 | Monroe | Feb. 17, 1903 |
| 1,958,910 | Christiansen | May 15, 1934 |
| 1,972,680 | Cushman | Sept. 4, 1934 |
| 2,114,580 | Thompson | Apr. 19, 1938 |
| 2,345,715 | Reed | Apr. 4, 1944 |
| 2,439,259 | McCormack | Apr. 6, 1948 |